US008326927B2

(12) United States Patent
Asthana et al.

(10) Patent No.: US 8,326,927 B2
(45) Date of Patent: Dec. 4, 2012

(54) METHOD AND APPARATUS FOR INVITING NON-RICH MEDIA ENDPOINTS TO JOIN A CONFERENCE SIDEBAR SESSION

(75) Inventors: Aseem Asthana, San Jose, CA (US); Manjunath S. Bangalore, San Jose, CA (US); Binh Don Ha, Fremont, CA (US); Vineet Goel, Santa Clara, CA (US); Connie Tang, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 645 days.

(21) Appl. No.: 11/439,311

(22) Filed: May 23, 2006

(65) Prior Publication Data
US 2007/0276908 A1  Nov. 29, 2007

(51) Int. Cl.
*G06F 15/16* (2006.01)
*G06F 15/173* (2006.01)
*H04L 12/16* (2006.01)
*H04B 7/00* (2006.01)

(52) U.S. Cl. ........ 709/204; 709/205; 709/206; 709/226; 370/260; 455/519

(58) Field of Classification Search .................. 709/204, 709/205, 206, 226; 370/260; 455/519
See application file for complete search history.

(56) References Cited

U.S. PATENT DOCUMENTS

| | | |
|---|---|---|
| 5,483,587 A | 1/1996 | Hogan et al. |
| 5,600,366 A | 2/1997 | Schulman |
| 5,673,253 A | 9/1997 | Shaffer |
| 5,729,687 A | 3/1998 | Rothrock et al. |
| 5,917,830 A | 6/1999 | Chen et al. |
| 5,963,217 A | 10/1999 | Grayson et al. |
| 6,044,081 A | 3/2000 | Bell et al. |
| 6,137,834 A | 10/2000 | Wine et al. |
| 6,141,324 A | 10/2000 | Abbott et al. |

(Continued)

FOREIGN PATENT DOCUMENTS

EP  1 553 735 A1  7/2005

(Continued)

OTHER PUBLICATIONS

Joerg Ott et al.; "Extended RTP Profile for RTCP-based feedback (RTP/AVPF)"; Jun. 29, 2002; RCF; pp. 1-43 http://www.ietf.org/proceedings/01dec/I-D/draft-ietf-avt-rtcp-feedback-01.txt.

(Continued)

*Primary Examiner* — Peter Shaw
(74) *Attorney, Agent, or Firm* — Baker Botts L.L.P.

(57) ABSTRACT

A conferencing system and method includes, during the conference session, invoking an interactive voice response (IVR) routine that provides names of one or more conference participants to a user of an audio-only endpoint device responsive to a request from the user to create a sidebar session. An invitation to join the sidebar session is then communicated to each of one or more participants selected by the user, the invitation being communicated via a private media channel separate from a media stream associated with the conference session. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

11 Claims, 5 Drawing Sheets

U.S. PATENT DOCUMENTS

| | | |
|---|---|---|
| 6,236,854 B1 | 5/2001 | Bradshaw |
| 6,269,107 B1 | 7/2001 | Jong |
| 6,275,497 B1 | 8/2001 | Varma |
| 6,332,153 B1 | 12/2001 | Cohen |
| 6,501,739 B1 | 12/2002 | Cohen |
| 6,505,169 B1 | 1/2003 | Bhagavath et al. |
| 6,570,926 B1 | 5/2003 | Agrawal et al. |
| 6,584,076 B1 | 6/2003 | Aravamudan et al. |
| 6,608,820 B1 | 8/2003 | Bradshaw |
| 6,624,841 B1 | 9/2003 | Buchner |
| 6,643,298 B1 | 11/2003 | Brunheroto et al. |
| 6,643,496 B1 | 11/2003 | Shimoyama et al. |
| 6,650,652 B1 | 11/2003 | Valencia |
| 6,671,262 B1 | 12/2003 | Kung et al. |
| 6,675,216 B1 | 1/2004 | Quatrano et al. |
| 6,718,553 B2 | 4/2004 | Kenworthy |
| 6,735,572 B2 | 5/2004 | Landesmann |
| 6,744,785 B2 | 6/2004 | Robinett et al. |
| 6,771,644 B1 | 8/2004 | Brassil et al. |
| 6,771,657 B1 | 8/2004 | Elstermann |
| 6,775,247 B1 | 8/2004 | Shaffer et al. |
| 6,816,469 B1 | 11/2004 | Kung et al. |
| 6,865,540 B1 | 3/2005 | Faber et al. |
| 6,876,734 B1 | 4/2005 | Summers et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,600 B1 | 10/2005 | Gaylord |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,031,348 B1 | 4/2006 | Gazit |
| 7,035,230 B1 | 4/2006 | Shaffer |
| RE39,135 E | 6/2006 | Riddle |
| 7,084,898 B1 | 8/2006 | Firestone et al. |
| 7,127,487 B1 * | 10/2006 | Wang et al. ............ 709/204 |
| 7,209,763 B2 * | 4/2007 | Martin et al. ............ 455/519 |
| 7,379,653 B2 | 5/2008 | Yap et al. |
| 7,404,001 B2 * | 7/2008 | Campbell et al. ............ 709/231 |
| 7,660,849 B1 | 2/2010 | Shaffer et al. |
| 7,847,815 B2 | 12/2010 | Patel |
| 2001/0000540 A1 | 4/2001 | Cooper et al. |
| 2002/0004841 A1 | 1/2002 | Sawatari |
| 2002/0006165 A1 | 1/2002 | Kato |
| 2002/0052214 A1 | 5/2002 | Maggenti et al. |
| 2002/0059627 A1 | 5/2002 | Islam |
| 2002/0087976 A1 | 7/2002 | Kaplan et al. |
| 2002/0110089 A1 | 8/2002 | Goldshtein et al. |
| 2002/0163918 A1 | 11/2002 | Cline |
| 2003/0016632 A1 | 1/2003 | Refai et al. |
| 2003/0023672 A1 | 1/2003 | Vaysman |
| 2003/0025786 A1 | 2/2003 | Norsworthy |
| 2003/0070072 A1 | 4/2003 | Nassiri |
| 2003/0076850 A1 | 4/2003 | Jason, Jr. |
| 2003/0104819 A1 * | 6/2003 | Knauerhase et al. ......... 455/456 |
| 2003/0198195 A1 | 10/2003 | Li |
| 2004/0057449 A1 | 3/2004 | Black |
| 2004/0165527 A1 | 8/2004 | Gu et al. |
| 2004/0165710 A1 | 8/2004 | DelHoyo et al. |
| 2004/0184586 A1 | 9/2004 | Coles et al. |
| 2004/0199659 A1 | 10/2004 | Ishikawa et al. |
| 2004/0213152 A1 | 10/2004 | Matuoka et al. |
| 2004/0250201 A1 | 12/2004 | Caspi |
| 2004/0255328 A1 | 12/2004 | Baldwin et al. |
| 2005/0062844 A1 | 3/2005 | Ferren |
| 2005/0069102 A1 | 3/2005 | Chang |
| 2005/0078171 A1 | 4/2005 | Firestone et al. |
| 2005/0081244 A1 | 4/2005 | Barett et al. |
| 2005/0094579 A1 | 5/2005 | Avharya et al. |
| 2005/0138372 A1 | 6/2005 | Kajihara et al. |
| 2005/0259803 A1 * | 11/2005 | Khartabil ............ 379/202.01 |
| 2006/0020995 A1 | 1/2006 | Opie et al. |
| 2006/0063551 A1 * | 3/2006 | Martin et al. ............ 455/519 |
| 2006/0067250 A1 * | 3/2006 | Boyer et al. ............ 370/260 |
| 2006/0072672 A1 | 4/2006 | Holcomb et al. |
| 2006/0090166 A1 | 4/2006 | Dhara et al. |
| 2006/0104458 A1 | 5/2006 | Kenoyer |
| 2006/0146734 A1 | 7/2006 | Wenger et al. |
| 2006/0189337 A1 | 8/2006 | Farrill et al. |
| 2006/0259755 A1 | 11/2006 | Kenoyer |
| 2007/0081644 A1 * | 4/2007 | Jachner ............ 379/106.01 |
| 2007/0110029 A1 | 5/2007 | Gilmore, II et al. |
| 2007/0123284 A1 | 5/2007 | Schliwa-Bertling et al. |
| 2007/0133435 A1 | 6/2007 | Eneroth et al. |
| 2007/0280464 A1 | 12/2007 | Hughes et al. |
| 2008/0043140 A1 | 2/2008 | Herpel et al. |

FOREIGN PATENT DOCUMENTS

| | | |
|---|---|---|
| WO | WO 00/19693 A1 | 4/2000 |

OTHER PUBLICATIONS

T. Friedman et al.; "RTP Control Protocol Extended Reports (RTCP XR)"; Network Working Group; Nov. 2003; pp. 1-55 http://www.ietf.org/rfc/rfc3611.txt.

Handley et al. SIP: Session Initiation Protocol. RFC 2543. Mar. 1999. pp. 13 and 14. http://tools.ietf.org/html/rfc2543.

* cited by examiner

US 8,326,927 B2

METHOD AND APPARATUS FOR INVITING NON-RICH MEDIA ENDPOINTS TO JOIN A CONFERENCE SIDEBAR SESSION

RELATED APPLICATIONS

This application is related to pending application entitled, "System With User Interface For Sending/Receiving Messages During A Conference Session", which application is assigned to the assignee of the present application.

FIELD OF THE INVENTION

The present invention relates generally to the fields of data networks and communication systems; more specifically, to conferencing systems and methods for group communications over a telephony network.

BACKGROUND OF THE INVENTION

Conferencing systems and methods, in which participants communicate in a conference session or meeting over existing voice and data networks, have been in existence for some time. Recent examples of conference calling systems include U.S. Pat. No. 6,865,540, which teaches a method and apparatus for providing group calls via the Internet; U.S. Pat. No. 6,876,734, which teaches an Internet-enabled conferencing system accommodating public switched telephone network (PSTN) and Internet Protocol (IP) traffic; U.S. Pat. No. 6,931,001, which discloses a system for interconnecting packet-switched and circuit-switched voice communications; and U.S. Pat. No. 6,671,262, which teaches a system with conference servers for combining IP packet streams in a conference call into combined packet streams, such that the combined IP packet stream utilizes no more bandwidth than each of the original packet streams.

A variety of different features and approaches for scheduling, control, and management of conference call sessions are also known. For instance, a conferencing system that facilitates a conference call by enabling a participant in the call session to determine and categorize the identities of the other participants is taught in U.S. Pat. No. 6,931,113. A conference calling system in which each participant may individually control incoming audio streams from other participants, and in which participants may communicate privately with each other in the context of the conference call, is disclosed in U.S. Pat. No. 6,501,739. U.S. Pat. No. 6,816,469 teaches an IP telephony network and PSTN network that allows one or more call waiting callers to dynamically join in an existing multiple party conference call session.

In addition, commercially-available IP communication system products such as Cisco's MeetingPlace™ conferencing application allow users to schedule meeting conferences in advance or, alternatively, to set up conferences immediately by dialing out to participant parties. Cisco Meeting-Place™ is typically deployed on a corporate network behind the firewall, and facilitates scheduling of business conferences from a touch-tone or voice over IP (VoIP) telephone, or a computer, using various software clients, such as Microsoft® Outlook, or a web browser.

Often times during a meeting or conference session certain participants want to exchange messages or engage in discussions without disturbing the other participants of the conference session. For instance, in the middle of a conference session several participants may want to have a sidebar conversation to discuss some important topic. Existing conferencing systems such as Cisco's MeetingPlace™ software product allow a subset of meeting participants to enter a "breakout" session or "room" in which individuals can establish their own private communication group session apart from the main conference session by pressing a predetermined keypad code or sequence (e.g., by pressing #1(1-9)).

In a rich media conferencing system, such as where each of the conference participants are in front of a PC, then everyone can communicate using an instant messaging (IM) client or similar web-based tool to invite selected participants to enter a breakout session. However, for conference participants that have endpoints devices with non-rich media capabilities, such as audio-only endpoints, this is a problem. Using existing conferencing systems, the only practical way to invite a person with an audio-only endpoint device to join a breakout or sidebar session is to interrupt the conference discussions in order to ask that person to join the sidebar session. Naturally, this disturbs the other participants and interferes with the ongoing discussions. For privacy reasons it may also be desirable to keep others from knowing that the sidebar conversation is currently in progress.

What is needed therefore is a conferencing system and method that overcomes the drawbacks of the prior art and which enables audio-only endpoints to receive an invitation to participant in a sidebar session conference session without disturbing the other participants to the conference session.

By way of further background, a U.S. Pat. Nos. 6,608,820 and 6,236,854 teach methods for controlling a conference call that allows a controlling party using a mobile handset to engage in a private conversation with only one of the subject parties in a conference. A mobile station includes a store for storing a special conference call participant "set-up number" in relation to the subject party number and/or name. In addition, U.S. Pat. No. 5,729,687 describes a computer conferencing system having a plurality of participants coupled by a communication medium, each participant of the plurality of participants having a meeting manager, a process and apparatus for joining participants in the conferencing system.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A method and apparatus that enables an audio-only endpoint device to initiate a sidebar session, or to receive and accept (or decline) a sidebar invitation during a conference session without disturbing the other participants to the conference session and without speaking into the main audio mixer of the system is described. In the following description specific details are set forth, such as device types, system configurations, protocols, methods, etc., in order to provide a thorough understanding of the present invention. However, persons having ordinary skill in the relevant arts will appreciate that these specific details may not be needed to practice the present invention.

According to one embodiment of the present invention, a mechanism is provided in which a conference participant can invite other participants to a sidebar (i.e., breakout) session regardless of whether any of the invitees, or the participant extending the invitation, has an audio-only (i.e., non-rich media) telephone device. That is, the endpoint devices utilized by participants during a conference session need not have display, IM, or web-access capabilities.

Figure 1:
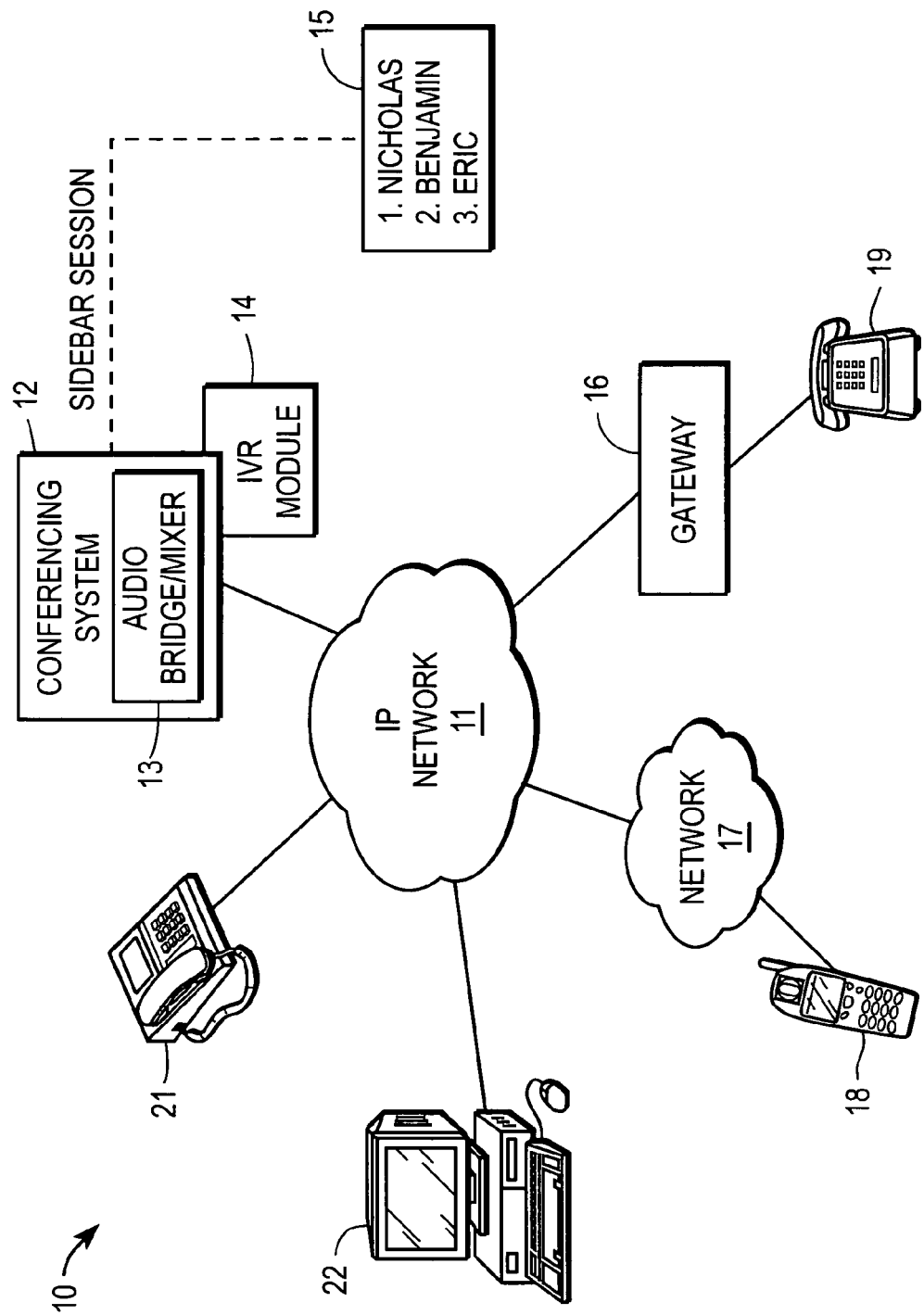
FIG. 1 is a conceptual diagram of a conferencing system in accordance with one embodiment of the present invention.

Referring to FIG. 1, an exemplary system 10 in accordance with one embodiment of the present invention is shown including a conference system 12 (e.g., a server) coupled with, or which includes, an audio bridge/mixer 13 that mixes audio signals received from each of the conference or meeting participants. In this example, the conference participants are shown by endpoint devices 18, 19, 21, and 22. Endpoint device 19 is an analog (audio-only) Plain-Old Telephone System (POTS) device coupled with conferencing system 12 via gateway device 16 and IP network 11. Endpoint device 18 is a cellular telephone that is coupled with conferencing system 12 via cellular telephone network 17 and IP network 11. Endpoint device 22 comprises a PC with built-in softphone capabilities (i.e., a PC that has phone capabilities installed or incorporated therein). Endpoint device 21 is a VoIP telephone with display capabilities that is coupled with conferencing system 12 via cellular telephone IP network 11. In general, an endpoint represents an end user, client, or person who is capable of participating in an audio conference session via conferencing system 12. Other endpoint devices not specifically shown in FIG. 1 that may be used to initiate or participate in a conference session include a personal digital assistant (PDA), a laptop or notebook computer, a non-IP telephone device, a audio/video appliance, a streaming client, a television device, or any other device, component, element, or object capable of initiating or participating in voice exchanges with conferencing system 12.

It is appreciated that the media path for the conference participants may include audio (voice) transmissions across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices (e.g., private branch exchange (PBX) systems, VoIP gateways, etc.). Practitioners in the arts will understand that each of the component modules and units shown in FIG. 1 may be implemented by hardware, firmware, or software component elements that implement the various functions described herein.

An interactive voice response (IVR) system module 14 is shown associated with conferencing system 12. IVR module 13 may be implemented in software, firmware, or hardware residing on the conference server, or comprise a separate module in system 10 accessible via IP network 11. In one embodiment, a non-rich media endpoint device, such as endpoint device 19, utilizes IVR module 14 to select participants to be invited to a sidebar session. By way of example, FIG. 1 illustrates a sidebar session 15 that has been created by conference system 12 in response to IVR prompts received from endpoint device 19. Sidebar session 15 is shown including three invited participants: Nicholas, Benjamin and Eric. To facilitate creation of the sidebar session, the user of endpoint device 19 may initiate sidebar invitation operations by entering a predefined input code, e.g., "#55". In response to the user dialing is code, IVR module 14 responds by prompting the user with an audio roll call of each of the participants to the conference. For instance, after each name is readout the IVR system may ask the user, "Do you want to invite this person to the sidebar session?" An affirmative response results in the participant's name being added to a list of participants to be invited into the sidebar session, where as a negative response results in the IVR system skipping over that person and moving on to the next person in the roll call list.

Alternatively, IVR module 14 may simply prompt the user to speak the names of the conference participants he wishes to invite to the sidebar session. For example, if there are a large number of participants in a conference session, the inviting participant may be prompted to perform a directory search for invitee participants. Various natural language automatic speech recognition (ASR) programs/modules associated with conferencing system 12 may be utilized for interpreting and parsing speech of the participants in order to assist in the process of correctly identifying the individual participants who are to be invited to join the sidebar session. In one embodiment, a speech recognition module may collect the names of all conference participants (e.g., upon initially joining the general session). The speech recognition module may also utilize or incorporate standard speech-to-text (STT) and text-to-speech (TTS) converter modules. (It is appreciated that IVR module 14, ASR module, and any other modules/units may either be incorporated into conferencing system 12, be separate components entirely, or included in other components of system 10.)

Once the inviting user has gone through the entire roll call of conference participants or otherwise completed his selection of sidebar session invitees, conferencing system 12 allocates sufficient conferencing resources (i.e., bandwidth, memory, etc.) for the sidebar and then begins the process of inviting each of the selected participants to join the sidebar session. Note that the invitation process can occur in several ways: visually, audibly, or both. A visual indication is basically a text display of the invitation and includes the name of the person who has extended the invitation. A purpose or subject of the sidebar session may optionally be included in the text display.

Figure 4:
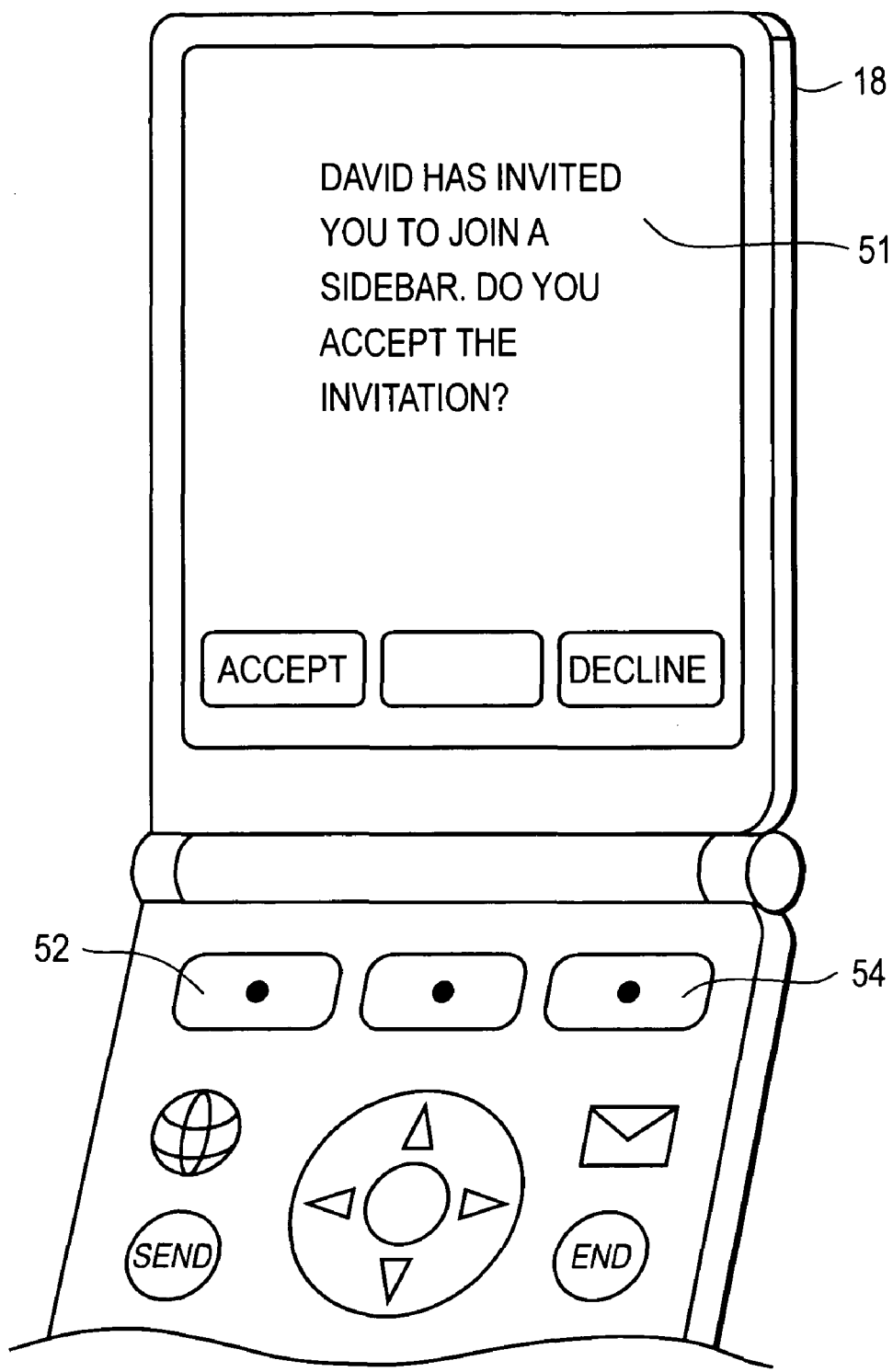
FIG. 4 illustrates a display window and portion of a keypad of a cellphone that may be utilized to accept/decline an invitation to join a sidebar session in accordance with one embodiment of the present invention.

FIG. 4 illustrates a cellphone device 18 having a display panel 51 that shows a visual text message invitation to join a sidebar session to an invitee participant to a conference session. The text message reads, "David has invited you to join a sidebar. Do you accept the invitation?" Note that the text message display may be preceded by, or be presented simultaneously with, an audible tone (e.g., a "beep-beep" sound) that alerts the user to the arrival of the text message. This audible tone, however, is not heard by the other participants in the conference session. That is, the audible tone is not mixed into the output media stream sent from audio bridge/mixer 13 to those endpoint devices participating in the conference session. Rather, the audible tone is delivered on a separate audio channel to the participant who has been invited to the sidebar session so that it is not heard by other conference participants.

In the example in FIG. 4, the user may accept the invitation to join the sidebar session by pressing keypad button 52. Upon acceptance, the cellphone user is automatically moved into the sidebar session that has been created or allocated by the conferencing system. Alternatively, the user may decline the invitation by pressing keypad button 54 on cellphone device 18. In one implementation, declining a sidebar invitation results in a message being sent to the inviting participant, notifying him that the named invitee has declined his invitation to join the sidebar session.

An audio invitation to join a sidebar session occurs automatically via the IVR system. The IVR menu or invitation prompt is delivered to the invitee participant on an audio channel that is separate from that used by audio bridge/mixer 13 so that it is not heard by other conference participants. In other words, the interactions between the IVR and the invitee participant are kept private and excluded from the main audio media stream sent from the mixer to each of the endpoints participating in the general conference discussions. Each invited participant may be played a prompt indicating the name of the person that invited him to join the sidebar conversation, along with an option to accept/reject the invitation. If the participant accepts the invitation and elects to join the sidebar session, he is automatically moved him into the sidebar session that the conferencing system previously allocated. On the other hand, if the invitee refuses the invitation, his refusal may be announced in the sidebar session (e.g., "Joe has declined to join the sidebar session.".

In another implementation, instead of being played an IVR prompt, a rich media endpoint (e.g., PC 22 in FIG. 1) may receive an Instant Message (IM) to join a sidebar session directly from the conferencing system.

In yet another embodiment, the conferencing system application may be configured to obtain presence information from each of the conference participants in order to determine the appropriate mechanism or channel to present the sidebar invitation to the conference participant. For example, conferencing system 12 may determine that since the participant associated with endpoint device 19 (see FIG. 1) has dialed into the conference through a telephone device without display capabilities, the appropriate notification modality for any sidebar invitation should be via an IVR prompt. On the other hand, the participant associated with endpoint device 21 may be notified via a text message displayed on his VoIP phone, with the phone's softkeys being configured for one or more appropriate responses. In the case of endpoint device 22, the invitation may be sent via a web-based IM ("pop-up") message.

Figure 2:
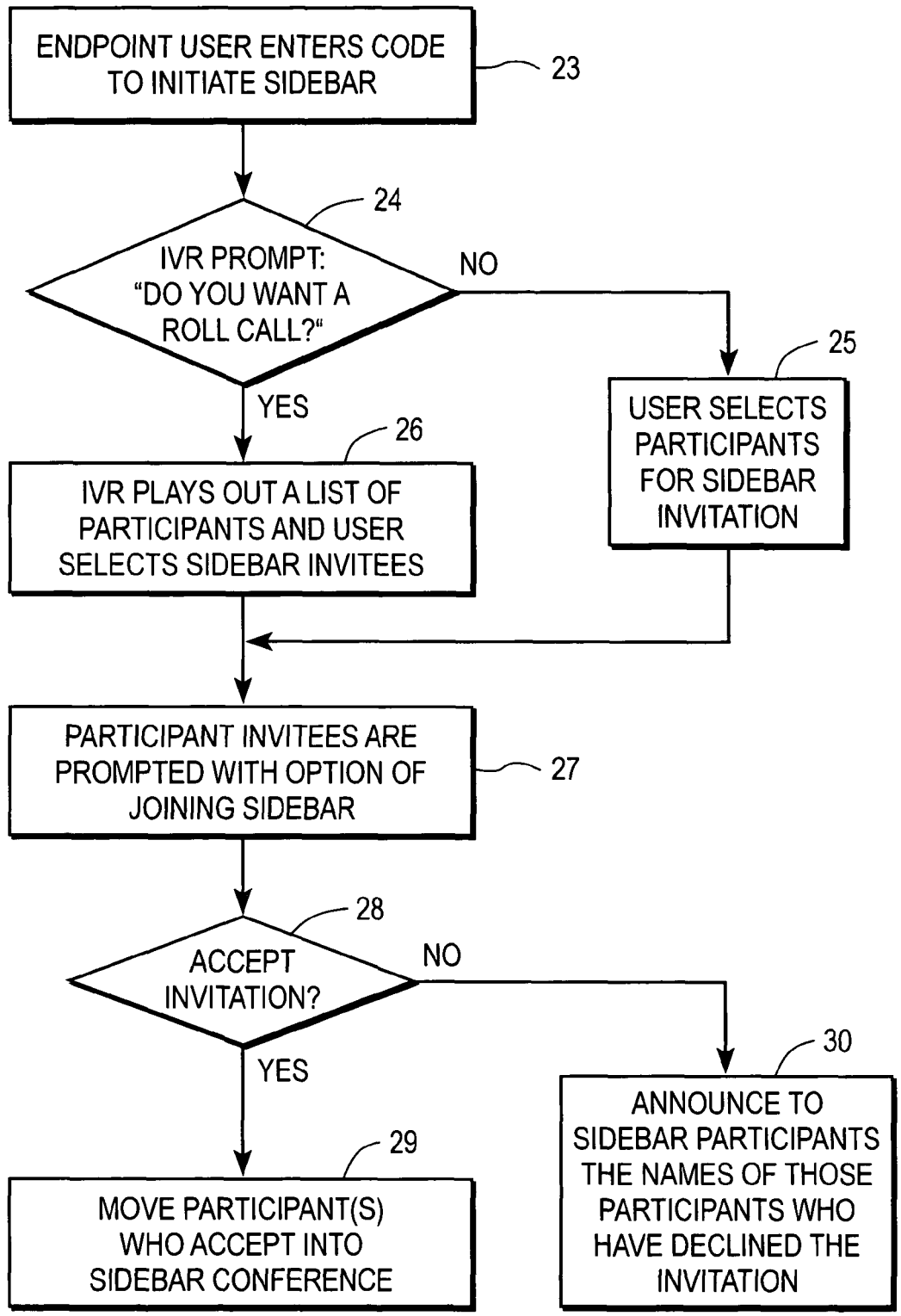
FIG. 2 is a flowchart diagram that illustrates a method of operation according to one embodiment of the present invention.

FIG. 2 is a flowchart diagram that illustrates an exemplary method of operation according to one embodiment of the present invention. The method starts when, during a conference session, one of the conference participants (i.e., an endpoint user) enters a command or code that initiates the process of selecting participants to invite to the sidebar session (block 23). Note that if the endpoint user who is initiating the sidebar session is doing so from a rich media endpoint device, a specialized graphical user interface (GUI) may be utilized to facilitate the invitation process. This aspect of the present invention will be discussed in more detail below. The embodiment of FIG. 2, however, is for a method of operation applicable to an audio-only endpoint device.

Once the inviting participant has initiated the sidebar invitation process, the IVR system begins by asking him whether he wishes a roll call listing of all of the conference participants (block 24). This step basically gives the inviting participant the opportunity to directly select the invitee participants (block 25)—assuming that he knows their names—thereby avoiding a potentially lengthy roll call listing of all the names of the participants to the conference session. Of the user may also perform a directory lookup search at this point in lieu of a roll call listing. This search can be based on first or last name, and should have common expansion options, such as providing all the names that match the spelling of the first three letters of a person's last name. In the event that the user elects to have the system provide him with a roll call of the conference participants, each participant name provided is followed by an IVR prompt asking whether that particular person should be invited to join the sidebar session (block 26). The user may select whether to invite that particular participant to the sidebar session by simply saying "yes" or pressing an appropriate keypad or softkey button on his telephone device (e.g., "1" or "#").

Regardless of the manner of how each of invitees is selected, after the user has completed the selection process the conferencing system automatically sends an invitation prompting the participant to join the sidebar session (block 27). Each invitee is prompted to either accept or decline the invitation (block 28). As discussed mentioned, the actual form of the invitation and the method of response by the invitee (e.g., telephony user interface) may vary depending upon the type of endpoint device utilized by the invitee participant. For example, in the case where the invitee has dialed into the conference session using an ordinary POTS phone an IVR menu prompt or "whisper" tone invitation message may be played to the person.

Acceptance of the invitation results in a participant being automatically moved out of the main conference session and into the sidebar session allocated by the conferencing system (block 29). In other words, when a participant accepts a sidebar invitation, the conferencing system immediately switches the audio media stream from his associated endpoint device so that it is no longer mixed and output to the general conference session. Instead, the audio stream of the endpoint device is mixed and sent out to those participants of the sidebar session only. Finally, in the embodiment of FIG. 2 the name of any participant who has declined an invitation to join the sidebar session is announced to the other sidebar participants (block 30).

According to one embodiment of the present invention, the process of initiating and inviting participants to a sidebar session may be facilitated through a specialized user interface implemented on an endpoint device. For example, in one implementation, PC 22 (see FIG. 1) may also include a graphical user interface (GUI) comprising a collaborative web-based application that is accessed by the browser software running on PC 22. In other instances, the GUI running on PC 22 may comprise a downloaded application of computer-executable code that may be loaded or accessed by PC 22. The GUI may facilitate downloading and graphical presentation of a roll call listing of conference participants allowing a user to select sidebar invitees simply by "right-clicking" on their displayed names, or by clicking and dragging their names between different fields (e.g., from a conference session field to a sidebar session field).

Figure 3:
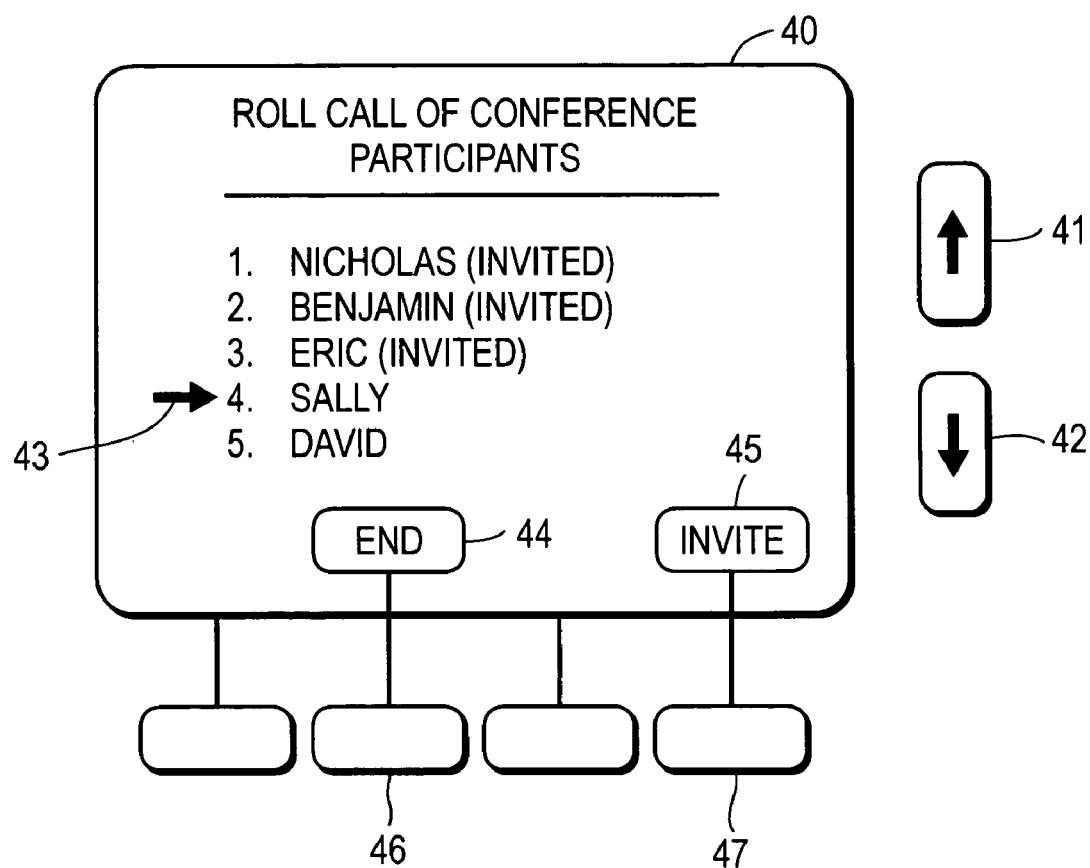
FIG. 3 is an Internet Protocol (IP) telephone device with a display window that may be utilized to invite selected participants into a sidebar session in accordance with one embodiment of the present invention.

FIG. 3 illustrates a display screen 40 of an IP phone (e.g., VoIP phone) according to one embodiment of the present invention. Display screen 40 comprises a specialized user interface useful in displaying conference participants and selecting participants to be invited to a sidebar session. The user interface shown in FIG. 3 may be generated by software (i.e., code) running on the user's IP phone. In this case, the IP phone can be equipped with a special "softkey" assignment button used to invoke or initiate a sidebar session. The template for this softkey button can be instantiated once the user joins the main conference session, or simply be located under a main conferencing menu on the telephone device. For example, to initiate a sidebar session a participant can simply the press the "sidebar" softkey button on his IP phone, resulting in the conferencing system sending a roll call listing of the conference participants to display 40, as shown in FIG. 3.

Note that in the example of FIG. 3, other than the user of the IP phone, five participants are presently in the conference session: Nicholas, Benjamin, Eric, Sally, and David. Of these four, Nicholas, Benjamin and Eric have already been invited by the user to join the sidebar session. The cursor arrow 43 is currently shown positioned by Sally's name. The user has the option of moving cursor arrow 43 up or down by pressing scrolling buttons 41 and 42, respectfully. An invitation to join the sidebar session is made by pressing softkey 47, which corresponds to icon 45 ("INVITE") on display screen 40. When the user is finished making his selections, he may end the invitation process by pressing softkey button 46, which corresponds to icon 44 ("END") on display screen 40. Ending the invitation process automatically causes the conferencing system to sending IVR menu prompts or text (e.g., IM) message invitations to each of the participants selected by the user.

It should be understood that the conference participant roll call list can be dynamically updated by the conferencing server as soon as individual endpoint devices join/leave the conference session, as opposed to a one-time download when the "sidebar" button is pressed. For example, if, during the selection process, a new endpoint device joins the main conference session, that person's name may be dynamically added to the roll call listing being presented on display screen 40.

Figure 5:
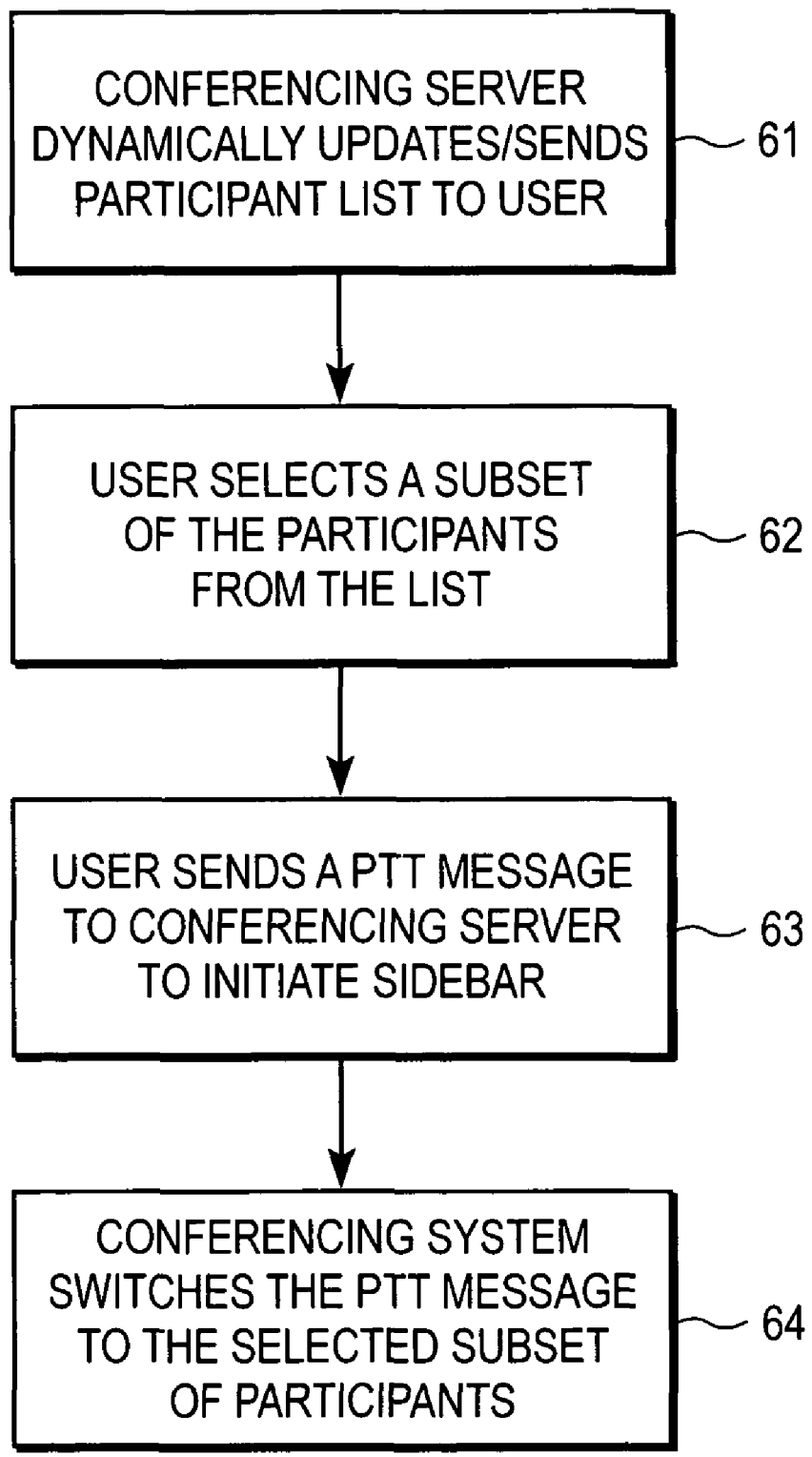
FIG. 5 is a flowchart diagram that illustrates a method of operation according to another embodiment of the present invention.

FIG. 5 is a flowchart diagram that illustrates a method of operation according to another embodiment of the present invention. The embodiment of FIG. 5 operates with endpoints having integrated presence capability, for example, cell phones or Wi-Fi phones that have push-to-talk (PTT) capabilities. PTT is a two-way communication service that works like a walkie-talkie. A normal cell phone call is full-duplex, meaning both parties can hear each other at the same time. PTT is half-duplex, meaning communication can only travel in one direction at any given moment. Many PTT systems in the concept known as "buddy" lists, which can be used to send messages simultaneously to a selected group of people whose names/numbers are stored as such in a memory. The buddy participant list can be dynamically updated by the conference server as soon as a participant joins in a conference (block 61). When the participant wishes to invite one or more other participants into a sidebar he may select a subset of participants from his buddy participant list (block 62) and send a PTT message to the conferencing server (block 63). The conferencing system responds to the PTT message by individually contacting each participant to ask them to join a particular sidebar session. The conferencing server may do this simply by switching the PTT message sent by the user to the selected subset of participants on the user's buddy list.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A processor-implemented method of operation involving a plurality of conference participants using a corresponding plurality of endpoint devices, comprising:

during a conference session implemented with a media stream comprising conference content, receiving a request to allocate a sidebar session from a first conference participant communicating via a Plain-Old Telephone Service (POTS) device without display capabilities;

obtaining presence information from each of the corresponding endpoint devices of the conference participants, the presence information including information indicating how the corresponding endpoint device is communicating with the conference session;

providing an interactive voice response (IVR) system to the first conference participant, the IVR system being operable to elicit names of one or more sidebar invitee conference participants from the first conference participant;

determining, based on the presence information, an appropriate notification modality for presenting a sidebar invitation to each sidebar invitee conference participant;

communicating the sidebar invitation via the appropriate notification modality to each of the one or more sidebar invitee conference participants, the sidebar invitation being communicated via a private media channel separate from the media stream of the conference session;

wherein the appropriate notification modality for a second conference participant communicating via a Plain-Old Telephone (POTS) device without display capabilities comprises an IVR prompt, and the appropriate notification modality for a third conference participant communicating via a rich media endpoint device comprises a visual display that elicits a response via a non-audio user interface.

2. The processor-implemented method of claim 1 wherein the IVR system is operable to provide the first conference participant with an audible roll call listing of all of the conference participants other than the first conference participant.

3. The processor-implemented method of claim 1 wherein the non-audio user interface comprises a graphical user interface.

4. The processor-implemented method of claim 1 further comprising:

receiving an acceptance from a first sidebar invitee conference participant; and moving the sidebar invitee conference participant out of the conference session and into the sidebar session.

5. The processor-implemented method of claim 4 further comprising:

receiving an invitation declination from a second sidebar invitee conference participant; and announcing in the sidebar session that the second sidebar invitee conference participant has declined to join the sidebar session.

6. A non-transitory computer-readable medium encoded with a computer program for conducting a conference session operable to:

obtain presence information from each of the corresponding endpoint devices of the conference participants, the presence information including information indicating how the corresponding endpoint device is communicating with the conference session;

during a conference session implemented with a media stream comprising conference content, invoke an interactive voice response (IVR) routine that provides names of one or more conference participants to a first conference participant communicating via a Plain-Old Telephone Service (POTS) device without display capabilities responsive to a request from the first conference participant to create a sidebar session;

determine, based on the presence information, an appropriate notification modality for presenting an invitation to each invitee of the sidebar session selected by the first conference participant via the IVR routine;

communicate the invitation to join the sidebar session to each invitee selected by the first conference participant, the invitation being communicated via the appropriate notification modality, the invitation being communicated via a private media channel separate from the media stream of the conference session;

wherein the appropriate notification modality for a second conference participant communicating via an audio-only endpoint device without display capabilities comprises an IVR prompt.

7. The computer-readable medium of claim 6 wherein the IVR routine comprises a sequence of queries such that the first conference participant of the audio-only endpoint device without display capabilities need only make an affirmative response or a negative response to each query.

8. The computer-readable medium of claim 6 wherein the appropriate notification modality for a third conference participant communicating via a rich media endpoint device comprises a visual display that elicits a response via a non-audio user interface.

9. The computer-readable medium of claim 6 further operable to:

perform a directory search based on a partial spelling or a first or last name of a conference participant.

10. The computer-readable medium of claim 8 wherein the non-audio user interface comprises a graphical user interface.

11. The computer-readable medium of claim 6 further operable to:

receive an invitation acceptance from a first conference participant; and move the first participant out of the conference session and into the sidebar session.

* * * * *